United States Patent
Zhou et al.

(10) Patent No.: US 8,860,042 B2
(45) Date of Patent: Oct. 14, 2014

(54) LIGHT MODULE HAVING METAL CLAMPS

(75) Inventors: Xin-Lin Zhou, Changhua County (TW); Chen-Yi Su, Taoyuan County (TW)

(73) Assignee: Lextar Electronics Corporation, Hsinchu (TW)

( * ) Notice: Subject to any disclaimer, the term of this patent is extended or adjusted under 35 U.S.C. 154(b) by 192 days.

(21) Appl. No.: 13/411,640

(22) Filed: Mar. 5, 2012

(65) Prior Publication Data
US 2013/0134448 A1    May 30, 2013

(30) Foreign Application Priority Data
Nov. 25, 2011 (TW) .............. 100143405 A

(51) Int. Cl.
H01L 31/12 (2006.01)
H01L 21/00 (2006.01)
F21V 8/00 (2006.01)

(52) U.S. Cl.
CPC .............. *G02B 6/0073* (2013.01); *G02B 6/009* (2013.01)
USPC ................. 257/81; 257/91; 257/99; 257/432; 438/117

(58) Field of Classification Search
CPC .. G02B 6/0073; G02B 6/0091; G02B 6/0083; G02B 6/0035; G02B 6/009; H01L 2924/12041
See application file for complete search history.

(56) References Cited

U.S. PATENT DOCUMENTS

| | | | |
|---|---|---|---|
| 2004/0036074 A1* | 2/2004 | Kondo | 257/79 |
| 2004/0036135 A1* | 2/2004 | Yang et al. | 257/433 |
| 2006/0158861 A1* | 7/2006 | Shouji et al. | 361/750 |
| 2008/0283847 A1* | 11/2008 | Moyer et al. | 257/81 |
| 2009/0261368 A1* | 10/2009 | Wang et al. | 257/98 |

FOREIGN PATENT DOCUMENTS

| | | |
|---|---|---|
| JP | 2003-036707 A | 2/2003 |
| JP | 2011-009139 | 1/2011 |
| JP | 2011-040488 A | 2/2011 |
| KR | 20110086648 A | 7/2011 |
| KR | 10-1074716 B1 | 10/2011 |
| KR | 20120042425 A | 5/2012 |
| TW | I243095 B | 11/2005 |
| TW | M339084 | 8/2008 |
| TW | 200846764 A | 12/2008 |
| TW | 200944711 A | 11/2009 |
| TW | M378404 | 4/2010 |
| TW | 201021638 A | 6/2010 |

\* cited by examiner

*Primary Examiner* — Alonzo Chambliss
(74) *Attorney, Agent, or Firm* — CKC & Partners Co., Ltd.

(57) ABSTRACT

A light component includes a printed circuit board and a plurality of lighting emitting diodes (LEDs). The printed circuit board has a metal substrate. The LEDs are disposed on the printed circuit board, wherein two opposite edges of the metal substrate protrude out and are bent towards the LEDs to form two metal clamps.

20 Claims, 5 Drawing Sheets

LIGHT MODULE HAVING METAL CLAMPS

RELATED APPLICATIONS

This application claims priority to Taiwan Application Serial Number 100143405, filed Nov. 25, 2011, which is herein incorporated by reference.

BACKGROUND

1. Field of Invention

The present invention relates to a light module and a light component thereof. More particularly, the present invention relates to an LED light module and a light component thereof.

2. Description of Related Art

A conventional LED light bar consists of LEDs soldered directly on a FR4 printed circuit board. However, as the high power LEDs are developed, a conventional FR4 printed circuit board is unable to sufficiently dissipate the heat generated by the high power LEDs. Therefore, a printed circuit board equipped with a metal core (also referred to as a Metal Core Printed Circuit Board) is developed for this need.

A conventional FR4 printed circuit board has a heat transfer coefficient of about 0.36 W/m.K. A metal core printed circuit board is equipped with a metal substrate, e.g., an aluminum or copper substrate, such that a heat transfer coefficient of the metal core printed circuit board can be enhanced up to about 1 W/m.K~2.2 W/m.K.

However, even if the LEDs can be soldered directly on the metal core printed circuit board, when the high power LEDs are densely mounted on the metal core printed circuit board, the heat dissipation issue still exists.

For the forgoing reasons, there is a need for improving the heat dissipation design of a high power LED light bar.

SUMMARY

It is therefore an objective of the present invention to provide a light component equipped with an improved heat dissipation design.

In accordance with the foregoing and other objectives of the present invention, a light component includes a printed circuit board and a plurality of lighting emitting diodes (LEDs). The printed circuit board has a metal substrate. The LEDs are disposed on the printed circuit board, wherein two opposite edges of the metal substrate protrude out and are bent towards the LEDs to form two metal clamps.

According to another embodiment disclosed herein, the two metal clamps and the metal substrate share the same or substantially the same thickness.

According to another embodiment disclosed herein, the metal substrate has a thickness greater than a thickness of each metal clamp.

According to another embodiment disclosed herein, the printed circuit board further includes a copper foil layer and an insulating layer, and the insulating layer is disposed between the copper foil layer and the metal substrate, and is in direct contact with both the copper foil layer and the metal substrate.

According to another embodiment disclosed herein, the copper foil layer and the insulating layer partially cover the metal substrate.

According to another embodiment disclosed herein, the copper foil layer and the insulating layer do not cover the two metal clamps.

According to another embodiment disclosed herein, the metal substrate includes aluminum, copper, aluminum alloy, copper alloy or any combinations thereof.

According to another embodiment disclosed herein, the metal substrate has a thickness ranging from about 0.1 mm to about 4 mm.

According to another embodiment disclosed herein, each of the two metal clamps has a resilient portion.

In accordance with the foregoing and other objectives of the present invention, a light module includes a light guide plate, a printed circuit board and a plurality of lighting emitting diodes (LEDs). The printed circuit board has a metal substrate. Two opposite edges of the metal substrate protrude out and are bent towards the LEDs to form two metal clamps for holding an outer edge of the light guide plate.

According to another embodiment disclosed herein, the two metal clamps and the metal substrate share the same or substantially the same thickness.

According to another embodiment disclosed herein, the metal substrate has a thickness greater than a thickness of each metal clamp.

According to another embodiment disclosed herein, the printed circuit board further includes a copper foil layer and an insulating layer, and the insulating layer is disposed between the copper foil layer and the metal substrate, and is in direct contact with both the copper foil layer and the metal substrate.

According to another embodiment disclosed herein, the copper foil layer and the insulating layer partially cover the metal substrate.

According to another embodiment disclosed herein, the copper foil layer and the insulating layer do not cover the two metal clamps.

According to another embodiment disclosed herein, the metal substrate includes aluminum, copper, aluminum alloy, copper alloy or any combinations thereof.

According to another embodiment disclosed herein, the metal substrate has a thickness ranging from about 0.1 mm to about 4 mm.

According to another embodiment disclosed herein, each of the two metal clamps has a resilient portion.

Thus, a light component of the light module has the designs of "two opposite edges of the metal substrate protruding out to form two metal clamps" and "two opposite edges of the metal substrate protruding out and bent to form two metal clamps for holding an outer edge of the light guide plate", thereby increasing the sizes of the heat dissipation layer and decreasing thermal insulating layers so as to effectively enhance the heat dissipation efficiency of the light component and achieving the purpose of holding the light guide plate.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
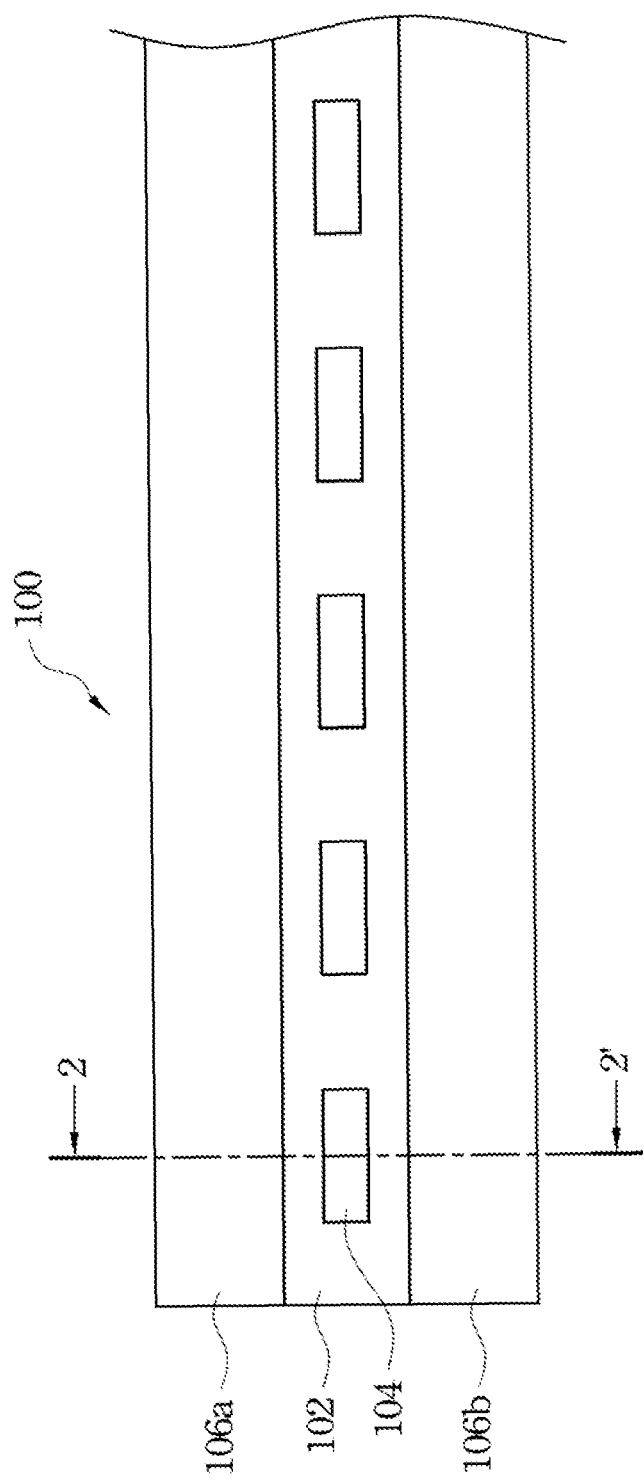
FIG. 1 illustrates a top view of a light component according to an embodiment of his invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
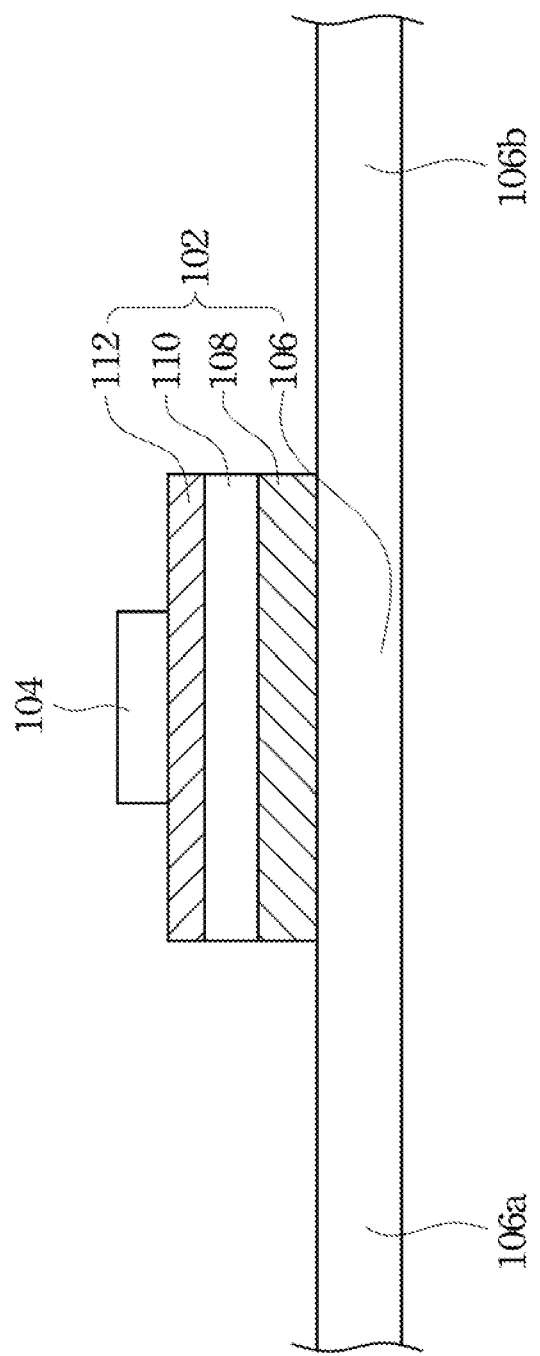
FIG. 2 illustrates a cross-sectional view taken along a line 2-2' in FIG. 1.
Figure 5:
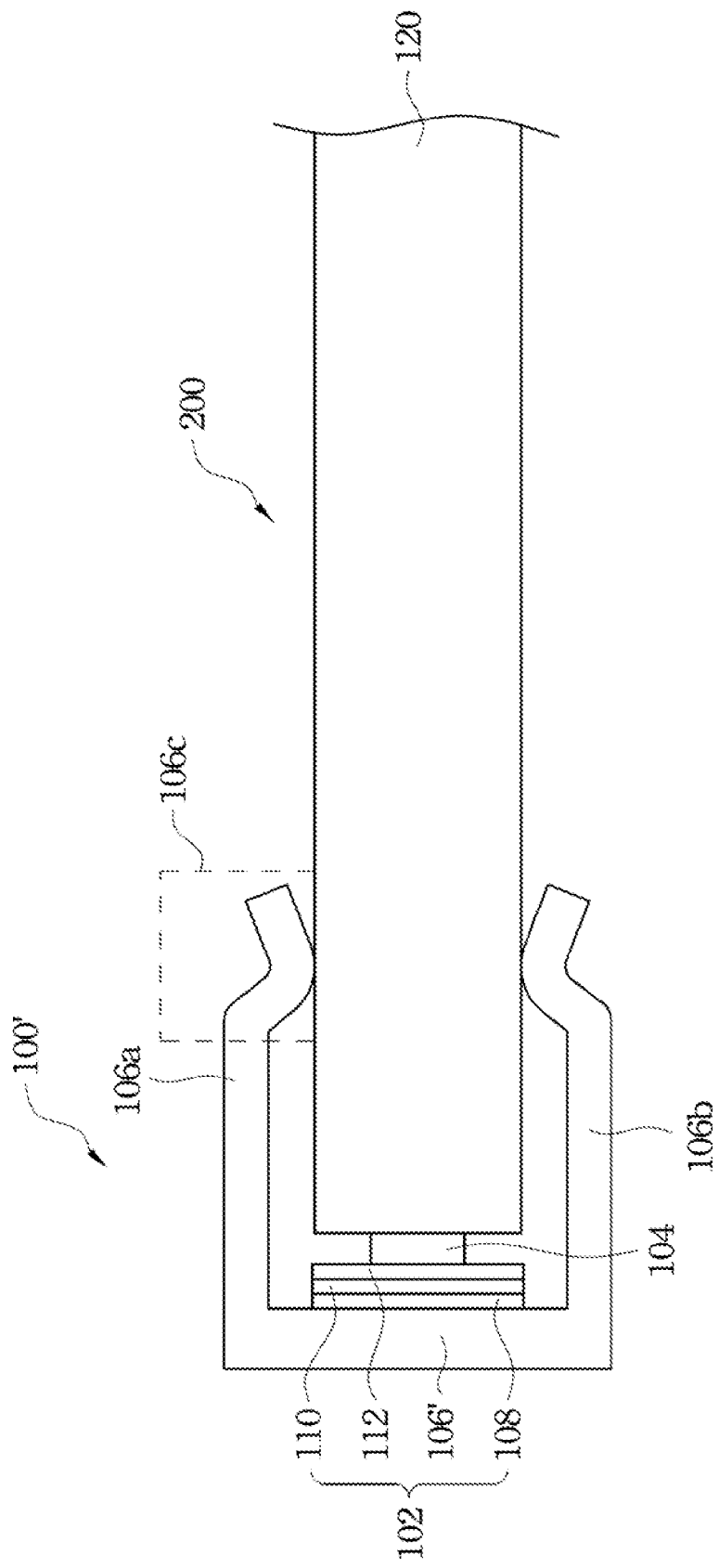
FIG. 5 illustrates a cross-sectional view of a light component holding a light guide plate according to still another embodiment of this invention.

Referring to FIG. 1 and FIG. 2, FIG. 1 illustrates a top view of a light component according to an embodiment of this invention, and FIG. 2 illustrates a cross-sectional view taken along a line 2-2' in FIG. 1. A light component 100 basically includes a printed circuit board 102, a plurality of LEDs 104 and a metal substrate 106. The LEDs 104 are soldered to the printed circuit board 102 and are electrically connected to the copper foil layer 110. The printed circuit hoard 102 is a printed circuit board with a metal core (also referred to as a Metal Core Printed Circuit Board), that is, the printed circuit board 102 has a metal substrate 106 (also referred to as a metal core), Two opposite edges of the metal substrate 106 protrude out to form two metal clamps (106a. 106b), that is, the two metal clamps (106a, 106b) and the metal substrate 106 are of one single substrate. In this embodiment, the two metal clamps (106a, 106b) and the metal substrate 106 share the same or substantially the same thickness. By the term "substantially the same thickness", it means a reasonable tolerance imposed on manufacturing the metal substrate 106. Two metal clamps (106a, 106b) may have a thickness different from a thickness of the metal substrate e.g., the metal substrate 106' has a thickness greater than a thickness of each metal clamp (106a, 106b) as illustrated in FIG. 5.

Referring to FIG. 2, the printed circuit board 102 includes a metal substrate 106, an insulating layer 108, a copper foil layer 110 and a solder resist layer 112. The insulating layer 108 is located between the copper foil layer 110 and the metal substrate 106, and is in direct contact with both the copper foil layer 110 and the metal substrate 106. The light component 100 is improved to dissipate the heat generated by the LEDs 104. The improvement is resulted from "two opposite edges of the metal substrate 106 protrude out to form two metal clamps (106a, 106b)", that is, the copper foil layer 110 and the insulating layer 108 partially cover the metal substrate 106. In particular, the copper foil layer 110 and insulating layer 108 do not cover the two metal clamps (106a, 106b). Because the two opposite edges of the metal substrate 106 protrude out to form two metal clamps (106a, 106b), i.e., the two metal clamps (106a, 106b) and the metal substrate 106 are of one single substrate, a heat transfer efficiency between the metal substrate 106 and the two metal clamps (106a, 106b) can be enhanced effectively. In a conventional design, an LED light bar is attached to a heat dissipation substrate, e.g., a metal substrate or a ceramic substrate, by an adhesive, and the adhesive interface downgrades heat transfer efficiency between the heat dissipation substrate and a printed circuit board of the LED light bar. In addition, the heat transfer efficiency of "the adhesive interface" is much lower than the heat transfer efficiency between two parts of one single heat dissipation substrate. The design of "the two opposite edges of the metal substrate 106 protruding out to form two metal clamps (106a, 106b)" not only enhances the heat transfer efficiency but also increases the heat dissipation area of the light component 100, and thus saves the costs of an additional heat dissipation substrate. The design strategy of the light component 100 is to increase the area of the metal substrate 106 and to decrease thermal insulating layers, i.e., an insulating layer 108 and a solder resist layer 112, so as to effectively enhance the heat dissipation efficiency of the light component 100.

In this embodiment, the metal substrate 106 can be made of aluminum, copper, aluminum alloy, copper alloy, aluminum copper alloy or other proper metal materials. The metal substrate 106 has a thickness ranging from about 1 mm to about 4 mm.

Figure 3:
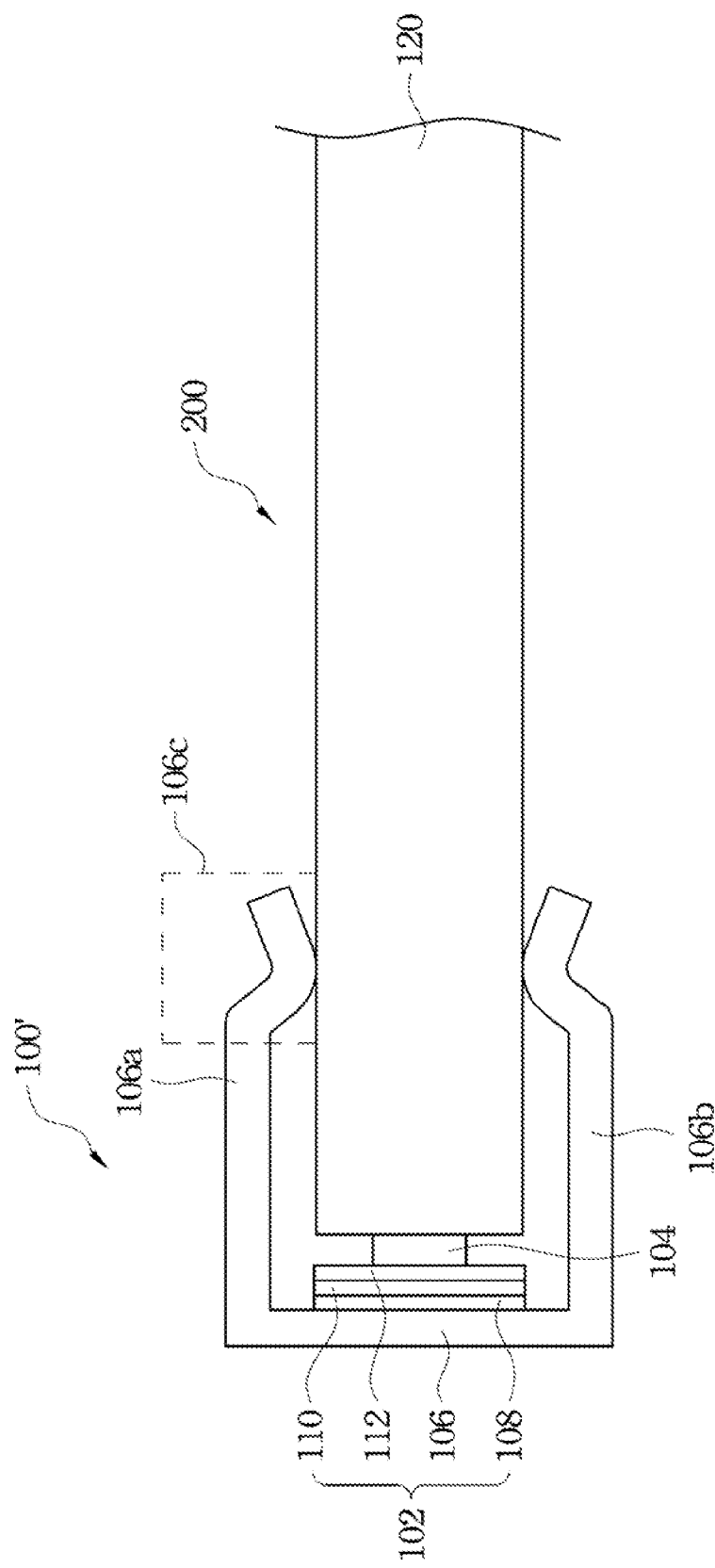
FIG. 3 illustrates a cross-sectional view of a light component holding a light guide plate according, to an embodiment of this invention.

FIG. 3 illustrates a cross-sectional view of a light component holding a light guide plate according to an embodiment of this invention. The light module 200 includes a light component 100' holding an outer edge of the light guide plate 120, which directs light beams from LEDs 104 towards desired directions. In this embodiment, two opposite edges of the metal substrate 106 protrude out and are bent towards the LEDs 104 to form two metal clamps (106a, 106b) for holding an outer edge of the light guide plate 120. Each of the two metal clamps (106a, 106b) has a resilient portion 106c at its end for firmly holding an outer edge of the light guide plate 120.

The two metal clamps (106a, 106b) can be bent to form proper shapes for firmly holding an outer edge of the light guide plate 120, and are not limited to the shape illustrated in FIG. 3. The two metal clamps (106a, 106b) can be manually bent to form proper shapes or bent by press molding or other suitable processes. The two metal clamps (106a, 106b) may have equal widths or different widths as long as the two metal clamps (106a, 106b) are able to hold the outer edge of the light guide plate 120. In sum, the two metal clamps (106a, 106b) are able not only to hold the outer edge of the light guide plate 120 but also to increase the heat dissipation area of the light component 100'. Moreover, the two metal clamps (106a, 106b) may be further processed, e.g., coating a reflective layer or polishing its surface, to have an inner reflective surface so as to effectively direct light beams from LEDs 104 into the light guide plate 120.

Figure 4:
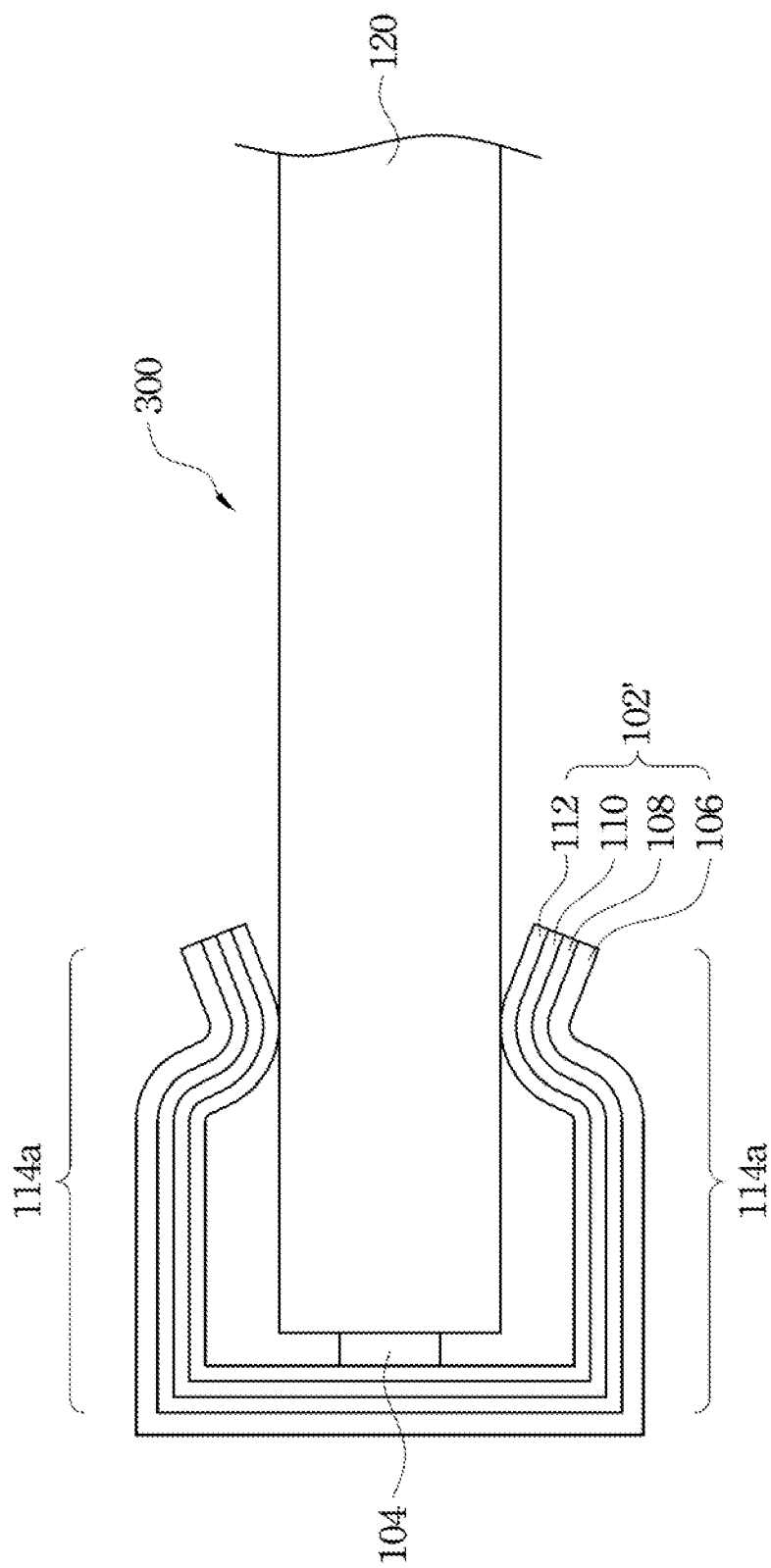
FIG. 4 illustrates a cross-sectional view of a light component holding a light guide plate according, to another embodiment of this invention.

FIG. 4 illustrates a cross-sectional view of a light component holding a light guide plate according to another embodiment of this invention. The light module 300 is different from the light module 200 in that two clamp portions (114a, 114b) of the light module 300 are two opposite edges of the printed circuit board 102', rather than clamp portions solely made form the metal substrate. That is, the insulating layer 108, copper foil layer 110 and solder resist layer 112 fully cover the clamp portions (114a, 114b) of the metal substrate 106. When the two clamp portions (114a, 114b) of the printed circuit board 102' are bent to hold the outer edge of the light guide plate 120, the solder resist layer 112 is in contact with the light guide plate 120. Compared with the light module 200, the printed circuit board of the light module 300 needs no further processing, i.e., removing the insulating layer 108, copper foil layer 110 and solder resist layer 112 covered on the two clamp portions, to form two clamp portions (114a, 114b) for holding the outer edge of the light guide plate 120. In addition, the copper foil layer 110 of the light module 300 is larger than the copper foil layer 110 of the light module 200 such that the heat dissipation efficiency of the light module 300 can be further enhanced.

In the heat dissipation design of the light module 200 and light module 300, the printed circuit board has its heat dissipation layers, i.e., the metal substrate and copper foil layer, increased in sizes and its thermal insulating layers, i.e., an insulating layer 108 and a solder resist layer 112, decreased, so as to effectively enhance the heat dissipation efficiency of the light component.

According to the above-discussed embodiments, a light component of the light module has the designs of "two opposite edges of the metal substrate protruding out to form two metal clamps" and "two opposite edges of the metal substrate protruding out and are bent to form two metal clamps for holding an outer edge of the light guide plate", thereby increasing the sizes of the heat dissipation layer and decreasing thermal insulating layers so as to effectively enhance the heat dissipation efficiency of the light component and achieving the purpose of holding the light guide plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light component comprising:
   a printed circuit board comprising:
      a metal substrate;
      a copper foil layer;
      an insulating layer, which is disposed between the copper foil layer and the metal substrate, is in direct contact with both the copper foil layer and the metal substrate; and
      a solder resist layer covered over the copper foil layer, wherein the copper foil layer, the insulating layer and the solder resist layer fully cover the metal substrate; and
   a plurality of lighting emitting diodes (LEDs) disposed on the printed circuit board, wherein two opposite edges of the metal substrate protrude out and are bent towards the LEDs to form two metal clamps.

2. The light component of claim 1, wherein the two metal clamps and the metal substrate share the same or substantially the same thickness.

3. The light component of claim 1, wherein the metal substrate has a. thickness greater than a thickness of each metal clamp.

4. The light component of claim 1, wherein the metal substrate comprises aluminum, copper, aluminum alloy, copper alloy or any combinations thereof.

5. The light component of claim 1 wherein the metal substrate has a thickness ranging from about 0.1 mm to about 4 mm.

6. The fight component of claim 1, wherein each of the two metal clamps has a resilient portion.

7. A light module comprising:
   a light guide plate;
   a printed circuit board comprising:
      a metal substrate;
      a copper foil layer;
      an insulating layer, which is disposed between the copper foil layer and the metal substrate, is in direct contact with both the copper foil and the metal substrate; and
      a solder resist layer covered over the copper foil layer, wherein the copper foil layer, the insulating layer and the solder resist layer fully cover the metal substrate; and
   a plurality of lighting emitting diodes (LEDs) disposed on the printed circuit board, wherein two opposite edges of the metal substrate protrude out and are bent towards the LEDs to form two metal clamps for holding an outer edge of the light guide plate.

8. The light module of claim 7, wherein the two metal clamps and the metal substrate share the same or substantially the same thickness.

9. The light module of claim 7, wherein the metal substrate has a thickness greater than a thickness of each metal clamp.

10. The light module of claim 7, wherein the metal substrate comprises aluminum, copper, aluminum alloy, copper alloy or any combinations thereof.

11. The light module of claim 7, wherein the metal substrate has a thickness ranging from about 0.1 mm to about 4 mm.

12. The light module of claim 7, wherein each of the two metal clamps has a resilient portion.

13. A light component comprising:
    a printed circuit board comprising:
       a metal substrate;
       a copper foil layer; and
       an insulating layer, which is disposed between the copper foil layer and the metal substrate, is in direct contact with both the copper foil layer and the metal substrate; and
    a plurality of lighting emitting diodes (LEDs) disposed on the printed circuit board, wherein two opposite edges of the metal substrate protrude out and are bent towards the LEDs to form two metal clamps, wherein the copper foil layer and the insulating layer do not cover the two metal clamps.

14. The light component of claim 13, wherein the printed circuit board further comprises a solder resist layer covered over the copper foil layer.

15. The light component of claim 13, wherein the two metal clamps and the metal substrate share the same or substantially the same thickness.

16. The light component of claim 13, wherein the metal substrate comprises aluminum, copper, aluminum alloy, copper alloy or any combinations thereof.

17. A light module comprising:
    a light guide plate;
    a printed circuit board comprising:
       a metal substrate;
       a copper foil layer; and
       an insulating layer, which is disposed between the copper foil layer and the metal substrate, is in direct contact with both the copper foil layer and the metal substrate; and
    a plurality of lighting emitting diodes (LEDs) disposed on the printed circuit board, wherein two opposite edges of the metal substrate protrude out and are bent towards the LEDs to form two metal clamps for holding an outer edge of the light guide plate, wherein the copper foil layer and the insulating layer do not cover the two metal clamps.

18. The light module of claim 17, wherein the printed circuit board further comprises a solder resist layer covered over the copper foil layer.

19. The light module of claim 17, wherein the two metal damps and the metal substrate share the same or substantially the same thickness.

20. The light module of claim 17, wherein the metal substrate comprises aluminum, copper, aluminum alloy, copper alloy or any combinations thereof.

* * * * *